May 9, 1933. R. J. GOLLONG ET AL 1,908,598
SWIVEL JOINT
Filed Sept. 8, 1931
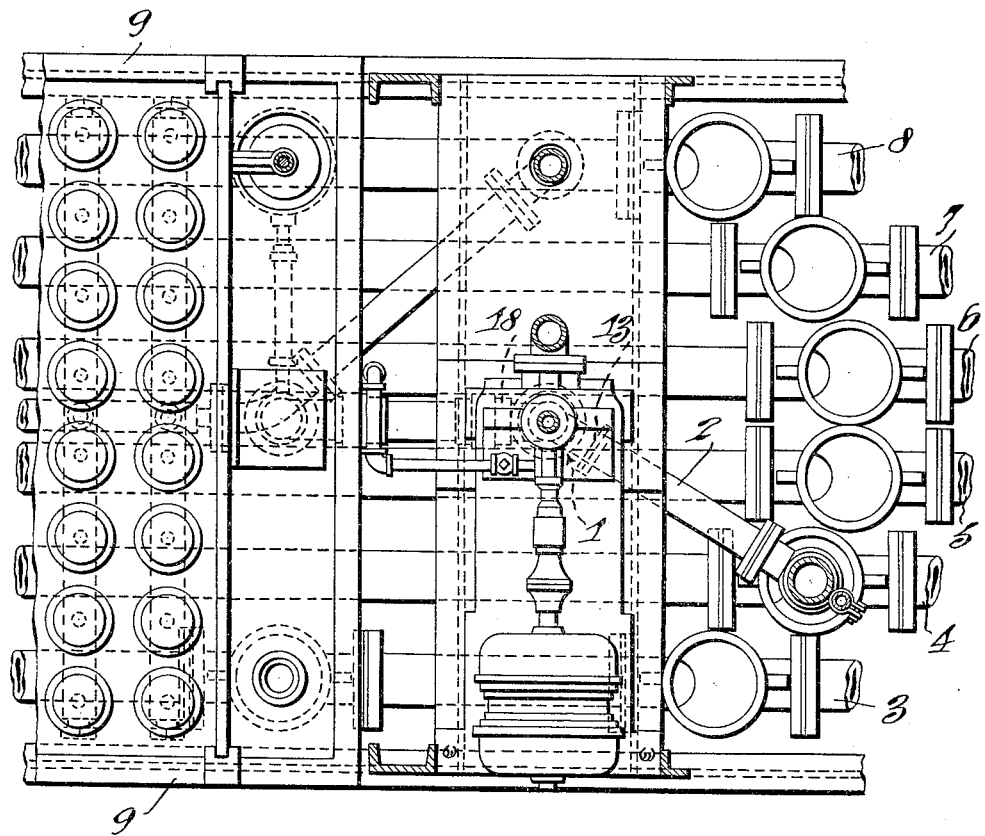
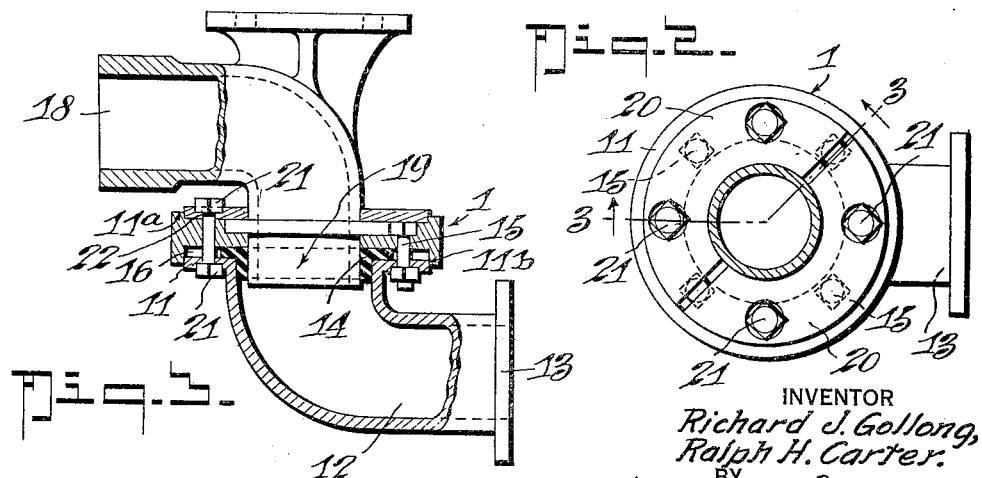
INVENTOR
Richard J. Gollong,
Ralph H. Carter.
BY Thomas H Byron
ATTORNEY Patented May 9, 1933

1,908,598

UNITED STATES PATENT OFFICE

RICHARD J. GOLLONG AND RALPH H. CARTER, OF JOHNSON CITY, TENNESSEE, ASSIGNORS TO AMERICAN GLANZSTOFF CORPORATION, OF NEW YORK, N. Y., A CORPORATION OF DELAWARE

SWIVEL JOINT

Application filed September 8, 1931. Serial No. 561,786.

Our present invention relates to a new type of swivel joint for use on a swing pipe.

One object of our invention is to provide a swivel joint which is of simple yet of effective construction.

Another object of our invention is to provide a swivel joint which is so constructed that there is no possibility of leakage.

These and other objects of our invention will become more apparent from a study of the following specification and of the attached drawing in which:

Figure 1 is a top plan view showing our new swivel joint in operation;

Figure 2 is a plan view of our new swivel joint; and,

Figure 3 is a view taken along lines 3—3 of Figure 2, and showing in addition thereto the two fittings.

Referring now to the drawing the numeral 1 indicates broadly our new swivel joint, connecting a swing pipe 2 to a series of pipes 3, 4, 5, 6, 7, 8. These pipes carry various treating liquids which are led by means of the swing pipe 2 and the swivel joint to a tank 9 containing a plurality of spools of artificial threads. The treatment of the threads is accomplished by the use of a vacuum washing system such as is disclosed in a co-pending application, S. N. 539,730, filed May 26, 1931, in the names of Oppenlaender, Gollong and Carter.

Referring now more particularly to Figures 2 and 3, we have shown in detail the construction of our new swivel joint. The swivel connection comprises an annular plate or ring 11, which is secured to the outwardly turned flange 12 of a fitting or elbow 13.

Extending between plate and flange is an inwardly extending washer 14 of rubber or other suitable material. This washer is held securely in position between plate or ring and the flange by means of a plurality of countersunk bolts 15 which pass through the holes provided in the plate or ring, gasket or flange. The ring is provided with upwardly and downwardly extending annular projections 11a, 11b, at its outer edge which are used to locate all component parts concentrically but are not absolutely necessary to the successful operation as the same results may be obtained by other means. The ring is also provided with a depressed portion or seat 16.

With the ring and gasket secured to the flange, the extension 19 of the fitting or elbow 18, is positioned within the fitting or elbow 13 forcing the inwardly extending portion of the washer downwardly and inwardly into the fitting 18. As may be clearly seen by an inspection of Figure 3, a leak proof joint is formed between the extension of the fitting 13 and the fitting 18, and the flange is fitted in the depressed portion formed in the ring. A split ring 20 is secured to the ring by means of a plurality of bolts 21 located in holes 22 in the split ring, the ring 11, the gasket and flange.

By this construction it will be appreciated that the fittings or elbows are so connected that a leak proof joint is formed therebetween and a swivel joint is obtained by virtue of the flange fitted in the depressed portion of the plate and held thereagainst by means of the split ring. Thus the flange of the fitting or elbow in the seat 16 formed in the annular plate or ring secures in rotatable relation the swing pipe connected to the fitting or elbow as it is moved to the various pipes 3, 4, etc. conveying the different treating liquids.

It is to be understood that the terms used in describing and claiming our invention are used in their descriptive sense and not as terms of limitaiton, and it is intended that all equivalents of these terms be included within the scope of the appended claims.

What we claim is:

1. A swivel joint for connecting two concentrically arranged conduits comprising a rib fixed to the inner conduit, a flange fixed to the outer conduit, an annular gasket adapted to rest upon said flange and to extend inwardly therefrom and contact with said inner conduit, an annular plate bolted to said flange to hold said gasket in place and positioned on one side of the rib on said inner conduit, and an annular plate positioned on the other side of said rib and bolted to said first mentioned annular plate.

2. A swivel joint for connecting two concentrically arranged fittings comprising a rib formed adjacent one end of one fitting, a flange formed on the end of the other fitting, an annular gasket positioned on said flange and having a portion projecting into said fitting and positioned snugly between said fittings, an annular plate secured to said flange to hold the gasket in place, said plate having a depressed portion formed therein to receive the said rib on the first mentioned fitting and an annular plate secured to said first mentioned plate engaging said rib and holding the same in the depressed portion.

In testimony whereof we affix our signatures.

RICHARD J. GOLLONG.
RALPH H. CARTER.